# 2,769,808

DIOXOLANE COMPOUNDS

Leon E. Tenenbaum, Brooklyn, N. Y., assignor to Nepera Chemical Co., Inc., Yonkers, N. Y., a corporation of New York No Drawing. Application August 13, 1953, Serial No. 374,161

5 Claims. (Cl. 260—247.7)

This invention relates to certain novel 1,3-dioxolane compounds and relates more particularly to 4-(o-toloxymethyl)-1,3-dioxolanes containing a substituted aminomethyl group in 2-position.

The novel compounds of my invention exhibit pronounced biological activity and are useful as muscle relaxants due to their ability to depress the central nervous system. These novel compounds are not only effective parenterally but are particularly valuable for oral administration, due to their appreciable solubility.

The compounds of my invention have the following general formula:

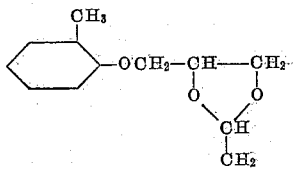

wherein R is an alkylamino group or a dialkylamino group in which the alkyl group contains from one to eight carbon atoms, or is a piperidino, morpholino, pyrrolidino, oxazolidino, thiamorpholino, thiazolidino or piperazylino group.

These compounds may be prepared by reacting 1-(o-toloxy) - 2,3 - dihydroxy-propane with dimethyl-chloroacetal or other lower dialkyl-chloro-acetal, wherein the alkyl group may be an ethyl, propyl or butyl group, as follows:

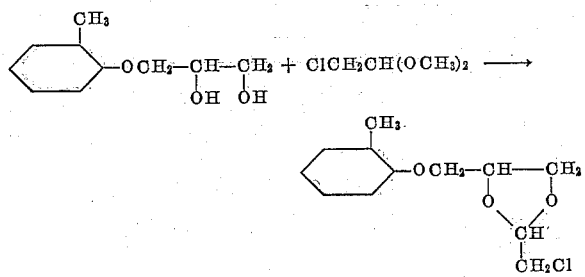

and then reacting the 2 - chloromethyl-4-(o-toloxy)-1,3-dioxolane obtained with a primary amine, secondary amine or a heterocyclic nitrogen compound, preferably employing a water-immiscible, inert organic solvent in the forming reaction mixture. By heating the reaction mixture formed under reflux or under pressure, the novel substituted 2-aminomethyl-4-(o-toloxy)-1,3-dioxolanes of my invention are obtained. The intermediate 2-chloromethyl-4-(o-toloxymethyl)-1,3-dioxolane is a novel compound and possesses analogous biological activity.

The novel 2-aminomethyl-4-(o-toloxy)-1,3-dioxolanes may be separated and purified by making reaction mixture alkaline with an aqueous solution of an inorganic base, such as sodium or potassium hydroxide, separating the organic layer and removing the solvent by distillation, etc. The residue is dissolved in a solvent such as hexane and the solution acidified with anhydrous hydrogen chloride. The hydrochloride of the novel substituted 2-aminomethyl-4-(o-toloxymethyl - 1,3-dioxolane separates out and may be further purified by recrystallization from acetone.

Alternatively the compounds of my invention may be obtained by reacting 1-(o-toloxy)-2,3-dihydroxy-propane with a substituted amino-acetal as follows:

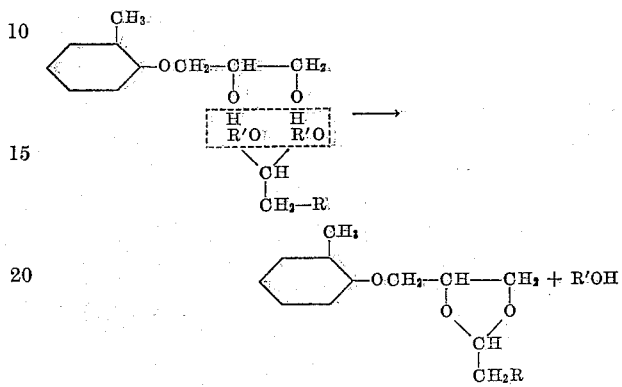

wherein R is an alkylamino group or a dialkylamino group in which the alkyl group contains from one to eight carbon atoms, or is a piperidino, morpholino, pyrrolidino, oxazolidino, thiamorpholino, thiazolidino or piperazylino group and R" is a lower alkyl group such as a methyl, ethyl, propyl or butyl group. The reaction may be carried out by heating the reactants and continuing the reaction until the formation of the alcohol by-product ceases. The desired product may then be separated and purified by fractional distillation and crystallization in the form of its hydrochloride or other soluble salt such as the sulfate, tartrate, citrate, maleate, salicylate, etc.

In order further to illustrate my invention but without being limited thereto, the following examples are given:

Example I 127 parts by weight of 1-(o-toloxy)-2,3-dihydroxy-propane, 124 parts by weight of dimethyl-chloro-acetal, and 1.8 parts by weight of sulfuric acid are heated at atmospheric pressure until the temperature of the distilling vapor reaches 80° C. The reaction mixture is then distilled under reduced pressure and the fraction boiling at 184° C. at 14 mm. is collected. The product obtained is 2 - chloromethyl - 4 - (o-toloxymethyl)-1,3-dioxolane. Analytical data for $C_{12}H_{15}O_3Cl$—found: Cl=14.8%; theory: Cl=14.7%.

Example II

A solution of 363 parts by weight of 2-chloromethyl-4-(o-toloxymethyl)-1,3-dioxolane and 203 parts by weight of dimethylamine in 860 parts by weight of xylene is heated under pressure for 24 hours at 135° C. The reaction mixture is then cooled and poured into cold concentrated sodium hydroxide. The organic layer is separated and the xylene removed under reduced pressure. The residue is dissolved in hexane and anhydrous hydrogen chloride passed into the solution. The hydrochloride of 2-dimethylaminomethyl - 4 - (o-toloxymethyl)-1,3-dioxolane separates and is purified by recrystallization from acetone. The melting point of this compound is 115–116° C. Analytical data for $C_{14}H_{22}O_3NCl$—found: N=4.75%; theory: N=4.88%.

Example III 121 parts by weight of 2-chloromethyl-4-(o-toloxymethyl) - 1,3 - dioxolane and 128 parts by weight of piperidine are refluxed in 260 parts by weight of xylene for 24 hours. The reaction mixture is made alkaline with aqueous caustic soda and the organic layer is separated. 2-(1-piperidylmethyl) - 4 - (o-toloxymethyl)1,3-dioxolane is separated by distillation under reduced pressure and collected at 190–195° C. at 4 mm. Analytical data for $C_{17}H_{25}O_3N$—found: N=4.77%; theory: N=4.81%.

*Example IV*

121 parts by weight of 2-chloromethyl - 4 - (o-toloxymethyl) - 1,3 - dioxolane and 131 parts by weight of morpholine are refluxed in 260 parts by weight of xylene for 24 hours. The reaction mixture is worked up as in Example III above. The 2-(4-morpholylmethyl)-4-(o-toloxymethyl)-1,3-dioxolane is separated by distillation under reduced pressure and boils at 191–194° C. at 3 mm. Analytical data for $C_{16}H_{23}O_4N$—found: N=4.75%; theory: N=4.77%.

*Example V*

87 parts by weight of 1-piperidyl-dimethylacetal and 91 parts by weight of 1-(o-toloxy)-2,3-dihydroxy-propane are heated at atmosphereic pressure by means of an oil bath maintained at about 100–120° C. and heating continued until no more methanol boiled over. The reaction mixture obtained is then distilled under reduced pressure and the 2-(1-piperidylmethyl) - 4 - (o-toloxymethyl)-1,3-dioxolane obtained boils at 190–195° C. at 4–5 mm. pressure. Analytical data for $C_{17}H_{25}O_3N$—found: N=4.72%; theory: N=4.81%.

*Example VI*

77 parts by weight of dibutylamino-diethylacetal and 61 parts by weight of 1-(o-toloxy)-2,3-dihydroxy-propane are heated to a temperature of 100–120° C. and heating continued until no more ethanol distills over. The product is then fractionated and the 2-dibutylaminomethyl-4-(o-toloxymethyl) - 1,3 - dioxolane obtained boils at 208–215° C. at 10 mm. pressure.

By reacting the product of Example I with other amines following the method described in Examples II to IV above, or the method of Examples V and VI, other similar compounds are readily obtained including the following:

2 - (1 - pyrrolidylmethyl) - 4 - (o - toloxymethyl) - 1,3-dioxolane
2 - (1 - morpholylmethyl) - 4 - (o - toloxymethyl) - 1,3-dioxolane
2 - (3 - oxazolidylmethyl) - 4 - (o - toloxymethyl) - 1,3-dioxolane
2 - (3 - thiazolidylmethyl) - 4 - (o - toloxymethyl) - 1,3-dioxolane
2 - (4 - thiamorpholymethyl) - 4 - (o - toloxymethyl)-1,3 - dioxolane
2 - (4 - morpholymethyl) - 4 - (o - toloxymethyl) - 1,3-dioxolane
2 - (1 - piperazylmethyl) - 4 - (o - toloxymethyl) - 1,3-dioxolane
2 - (diethylaminomethyl) - 4 - (o - toloxymethyl) - 1,3-dioxolane
2 - (dipropylaminomethyl) - 4 - (o - toloxymethyl) - 1,3-dioxolane
2 - (diisopropylaminomethyl) - 4 - (o - toloxymethyl)-1,3 - dioxolane
2 - (dioctylaminomethyl) - 4 - (o - toloxymethyl) - 1,3-dioxolane
2 - (ethylmethylaminomethyl) - 4 - (o - toloxymethyl)-1,3 - dioxolane
2 - (ethylpropylaminomethyl) - 4 - (o - toloxymethyl)-1,3 - dioxolane
2 - (methylbutylaminomethyl) - 4 - (o - toloxymethyl)-1,3 - dioxolane
2 - (methyloctylaminomethyl) - 4 - (o - toloxymethyl)-1,3 - dioxolane It is understood that the foregoing detailed description is given merely by way of illustration and that many variations may be made therein without departing from the spirit of my invention.

Having described my invention, what I desire to secure by Letters Patent is:

1. Compounds of the group consisting of

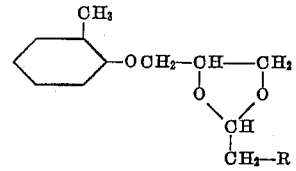

wherein R is a substituted amino group linked through nitrogen to the methylene group and is selected from the group consisting of lower alkylamino and di-lower-alkylamino groups wherein the alkyl group contains from one to four carbon atoms, piperidino, morpholino and pyrrolidino, groups, and their water-soluble salts.

2. 2 - dimethylaminomethyl - 4 - (o - toloxymethyl)-1,3 - dioxolane.

3. 2 - (1 - piperidylmethyl) - 4 - (o - toloxymethyl)-1,3 - dioxolane.

4. 2 - (4 - morpholylmethyl) - 4 - (o - toloxymethyl)-1,3 - dioxolane.

5. 2 - (dibutylamino) - 4 - (o - toloxymethyl) - 1,3-dioxolane.

References Cited in the file of this patent

UNITED STATES PATENTS

| | | |
|---|---|---|
| 2,428,805 | Kharasch | Oct. 14, 1947 |
| 2,439,969 | Fourneau | Apr. 20, 1948 |
| 2,606,907 | Blicke | Aug. 12, 1952 |
| 2,606,908 | Blicke | Aug. 12, 1952 |
| 2,606,909 | Blicke | Aug. 12, 1952 |
| 2,636,884 | Tenenbaum | Apr. 28, 1953 |

OTHER REFERENCES

Berger et al., Science, vol. 108, pp. 561–562, Nov. 19, 1948.